(12) United States Patent
Deng et al.

(10) Patent No.: US 9,990,745 B2
(45) Date of Patent: Jun. 5, 2018

(54) PERSONALIZED-RECOMMENDATION GRAPH

(71) Applicant: Facebook, Inc., Menlo Park, CA (US)

(72) Inventors: Peter Xiu Deng, Mountain View, CA (US); Joshua Williams, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 654 days.

(21) Appl. No.: 13/689,956

(22) Filed: Nov. 30, 2012

(65) Prior Publication Data

US 2014/0152666 A1    Jun. 5, 2014

(51) Int. Cl.
*G06T 11/20* (2006.01)
*H04L 12/58* (2006.01)
*G06Q 50/00* (2012.01)
*G06Q 30/02* (2012.01)

(52) U.S. Cl.
CPC ............ *G06T 11/206* (2013.01); *G06Q 50/01* (2013.01); *H04L 51/14* (2013.01); *H04L 51/32* (2013.01); *G06Q 30/0241* (2013.01); *G06Q 30/0278* (2013.01)

(58) Field of Classification Search
None
See application file for complete search history.

(56) References Cited

U.S. PATENT DOCUMENTS

| | | | |
|---|---|---|---|
| 8,095,432 B1 * | 1/2012 | Berman et al. | 705/26.7 |
| 2006/0143068 A1 * | 6/2006 | Calabria | 705/10 |
| 2011/0173130 A1 * | 7/2011 | Schaefer et al. | 705/347 |
| 2011/0276565 A1 * | 11/2011 | Zheng | G01C 21/20 707/724 |
| 2012/0143963 A1 * | 6/2012 | Kennberg | G06Q 10/107 709/206 |
| 2012/0233158 A1 * | 9/2012 | Braginsky | H04L 67/18 707/724 |

OTHER PUBLICATIONS

Jim Kaskade, Big Data & the Future of Selling 'Stuff', posted on Jan. 4, 2012.*
"Dropp—What if you could leave a message for someone anyplace on earth?" http://madewithsense.com/dropp/, Downloaded Nov. 26, 2012.
"Dropp for iPhone reminds, warns and send love letters by location—Apps," http://thenextweb.com/apps/2011/06/14/dropp- for-iphone- reminds- warns-and- sends- love- letters- by- location/, Downloaded Nov. 19, 2012.

(Continued)

*Primary Examiner* — Weiming He
(74) *Attorney, Agent, or Firm* — Baker Botts L.L.P.

(57) ABSTRACT

In one embodiment, a method includes receiving a number of recommendations for a first user. Each recommendation being made by a second user and including information that: identifies an item being recommended; provides an explanation for the recommendation; identifies the first user as an addressee of the recommendation; and identifies the second user as an author of the recommendation. The method also includes providing for presentation to the first user one or more of the recommendations.

21 Claims, 7 Drawing Sheets

(56) References Cited

OTHER PUBLICATIONS

"Dropp Lets You Leave Location Based Messages for People," http://techland.time.com/2011/06/15/dropp- lets- you- leave- location- based-messages- for- people/, Downloaded Nov. 26, 2012.
"Location-Based Messaging: Surprisingly Useful?" http://technology.inc.com/2011/06/16/location- based- messaging- surprisingly-useful/, Downloaded Nov. 26, 2012.
"Today's Obsession: Dropp," http://imprint.printmag.com/patricking/todays-obsession- dropp/, Downloaded Nov. 26, 2012.

* cited by examiner

PERSONALIZED-RECOMMENDATION GRAPH

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments provide personalized and curated recommendations provided by other users. A recommending user may recommend a particular business to a specific user or group of users. An example syntax for a recommendation may be "Recommend Place for explanation to particular user". For example, User B may input "Recommend the Milk Pail for great cheese selection to User A. The social-networking system server may aggregate the recommendations to create a recommendation graph for each user.

In particular embodiments, when the user is in proximity to a business recommended by another user, the recommendation and which user made the recommendation may be displayed on the user's mobile device. For example, when User A walks past the Milk Pail, the mobile device may display the recommendation from User B recommending the Milk Pail for the cheese selection. In particular embodiments, the user may also access and browse (i.e. mine) the recommendations provided by other users to search for recommends associated with specific kinds of businesses (e.g. restaurants). The user may act on recommendations based on their knowledge of the recommending users, that is weigh recommendations based on knowledge of the user making the recommendation.

DESCRIPTION OF EXAMPLE EMBODIMENTS

Figure 1:
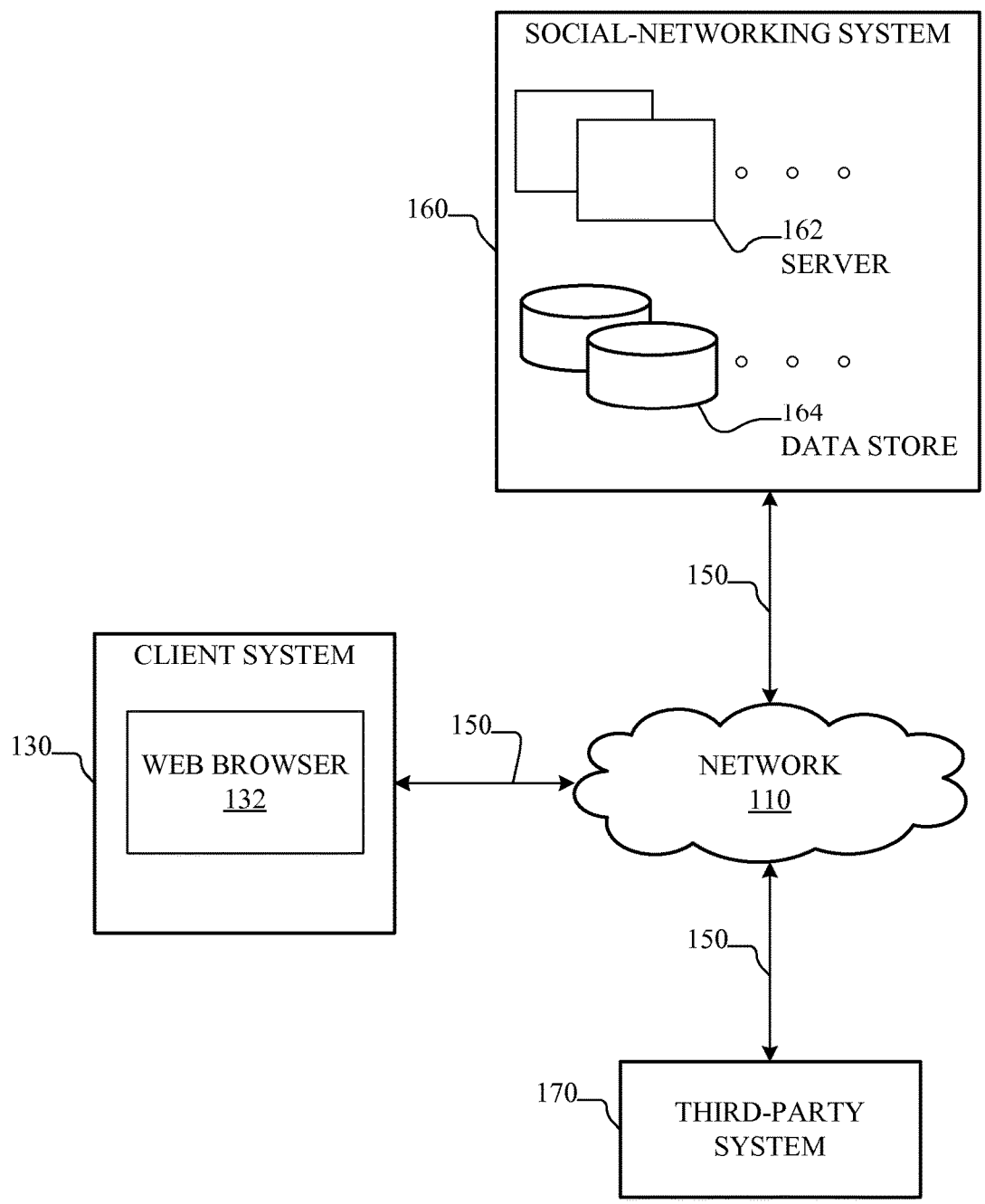
FIG. 1 illustrates an example network environment associated with a social-networking system.

FIG. 1 illustrates an example network environment associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as for example, a personal computer, or a mobile device including a laptop computer, a mobile telephone, a smartphone, or a tablet computer. In particular embodiments, client system 130 may be mobile device, as described below.

One or more recommending users may provide personalized or curated recommendations for user 101 or a group of users that includes user 101. A server of social-networking system 160 or third-party system 170 may receive one or more recommendations for user 101 provided by one or more recommending users. In particular embodiments, a recommending user may provide a recommendation for user 101 through a recommendation page hosted by social-networking system 160 or third-party system 170. As an example and not by way of limitation, a recommendation page may include a selectable "recommend" icon or a selectable "like" icon associated with a particular item and a text box for providing an explanation for the recommendation. Social-networking system 160 may aggregate one or more recommendations to generate one or more recommendation graphs, described below, that may be stored in one or more data stores. As an example and not by way of limitation, a recommendation graph, described below, may be a subset of a social graph.

A server of social-networking system 160 or third-party system 170 may send one or notifications for user 101 to client system 130. In particular embodiments, social-networking 160 or third-party 170 may select a particular recommendation from among the recommendations for user 101 based at least in part on a ranking of the recommendations. As an example and not by way of limitation, the recommendations for user 101 may be ranked based at least in part on social-graph information, the presence of information augmenting a recommendation, i.e. an explanation, or any combination thereof. In particular embodiments, a notification of the highest ranked recommendation may be sent to client device 130 associated with user 101. As an example and not by way of limitation, the notification may include a recommendation with an explanation instead of a recommendation without a recommendation. As another example, if social-networking 160 or third-party 170 system sends multiple notifications that each correspond to a recommendation from a recommending user, the notifications may be sent in order of their ranking Although this disclosure describes ranking recommendations using particular criteria, this disclosure contemplates ranking recommendations using any suitable criterion, such as for example, a relationship between the recommending user and the user based at least in part on social-graph information or a ranking of recommending users made by the user.

In particular embodiments, the notification may be displayed on a display of client system 130 associated with user 101. As an example and not by way of limitation, a server of social-networking system 160 may send a signal initiating display of a modal window on one or more client systems 130 associated with user 101. In particular embodiments, the content of the notification may be based at least in part on recommendation-graph information, as described below. As an example and not by way of limitation, the content the recommendation may be associated with a particular business at a particular geo-location. As described below, the content of the displayed notification may include information associated with the explanation associated with the recommendation to user 101, such as for example, a particular business caters to a particular interest of user 101 as determined by a recommending user. In particular embodiments, social-networking system 160 or third-party system 170 may send the notification based on the current geo-location of client device 130 associated with user 101. As an example and not by way of limitation, the content of the modal window may recommend a particular restaurant specializing in a particular cuisine when the current geo-location of user 101 is near or at the particular restaurant. Although this disclosure describes sending a particular form of notification, this disclosure contemplates any suitable form of notification sent or displayed on the client system associated with the user, such as for example, short-messaging service (SMS) messages, multi-media messaging service (MMS) messages, instant messaging, balloon, dialog box, or e-mail. In particular embodiments, the notification may include additional information associated with an item, such as for example, a webpage or link to a review associated with the item.

In particular embodiments, user 101 may access and browse or "mine" the recommendation graph for recommendations provided by recommending users associated with particular criteria of interest to user 101. In particular embodiments, when user 101 queries the recommendation graph stored on social-networking system 160 through client system 130, for example, one or more web servers may transmit data to a recommendation engine of social-networking system 160 to access the recommendation graph. In particular embodiments, client system 130 may send a social-networking-user identification (ID) to the recommendation engine. As an example and not by way of limitation, the recommendation engine may provide a list of recommendations accessed through the recommendation graph of the user based on the user ID. As another example, the recommendation engine may provide a subset of the recommendations of the recommendation graph based on one or more search criteria provided by user 101.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
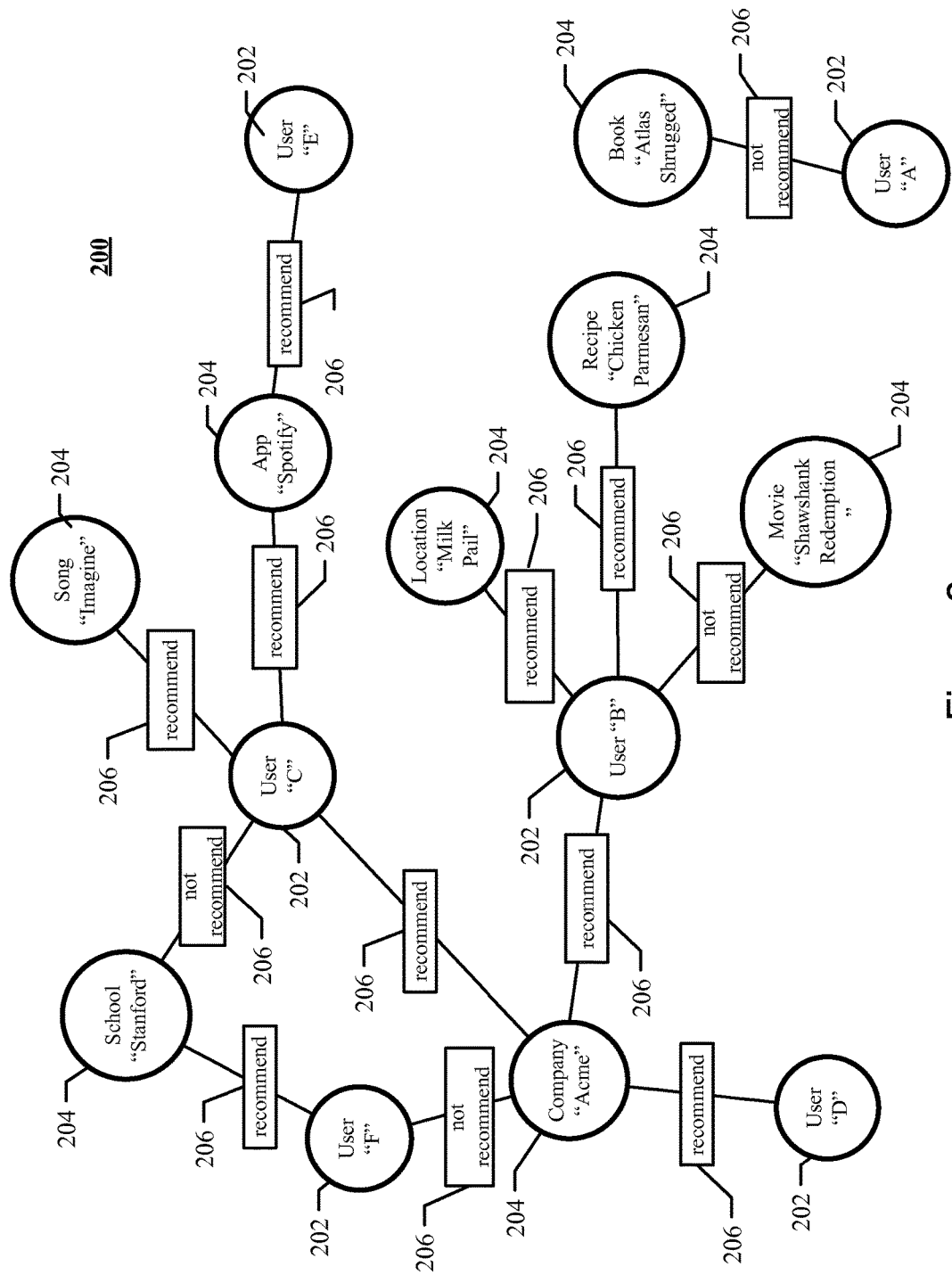
FIG. 2 illustrates an example recommendation graph.

FIG. 2 illustrates an example recommendation graph associated with a particular user. As described above, the social-networking system may aggregate one or more recommendations provided by recommending users to generate recommendation graph 200 associated with a particular user. In particular embodiments, the social-networking system may store one or more recommendation graphs 200 in one or more data stores. In particular embodiments, recommendation graph 200 may include multiple nodes—which may include multiple recommending user nodes 202 or multiple item nodes 204—and multiple edges 206 connecting the nodes. Example recommendation graph 200 illustrated in FIG. 2 is shown, for didactic purposes, in a two-dimensional visual-map representation. In particular embodiments, a social-networking system 160, client system 130, or third-party system 170 may access recommendation graph 200 and related recommendation-graph information for suitable applications. The nodes 202 and 204, and edges 206 of recommendation graph 200 may be stored as data objects, for example, in a data store (such as a recommendation-graph database). Such a data store may include one or more searchable or queryable indices of nodes 202 and 204, or edges 206 of recommendation graph 200. Although this disclosure illustrates and describes a particular recommendation graph formed using particular nodes and edges, this disclosure contemplates any suitable recommendation graph formed using any suitable nodes and edges in any suitable manner.

In particular embodiments, a recommending user node 202 may correspond to a user of the social-networking system. As an example and not by way of limitation, a recommending user may be an individual that interacts or communicates with or over the social-networking system. In particular embodiments, when a user provides a recommendation to the social-networking system, the social-networking system may create a recommending user node 202 corresponding to the recommending user, and store the recommending user node 202 in one or more data stores. Recommending users and recommending user nodes 202 described herein may, where appropriate, refer to registered recommending users and recommending user nodes 202 associated with registered recommending users. In addition or as an alternative, recommending users and recommending user nodes 202 described herein may, where appropriate, refer to users that have not registered with the social-networking system. In particular embodiments, a recommending user node 202 may be associated with information provided by a recommending user or information gathered by various systems, including the social-networking system. In particular embodiments, a recommending user node 202 may be associated with one or more data objects corresponding to information associated with a recommending user.

In particular embodiments, a item node 204 may correspond to an item. As an example and not by way of limitation, a item may correspond to a geo-location (such as, for example, a movie theater, restaurant, landmark, or city); a website (such as, for example, a website associated with the social-network system or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; a concept or theory; another suitable item; or two or more such items. An item node 204 may be associated with information of a item provided by a recommending user or information gathered by various systems, including the social-networking system. As an example and not by way of limitation, information of a item may include a name or a title; one or more images (e.g., an image of the cover page of a book); a location (e.g., an address or a geographical location); a website (which may be associated with a URL); contact information (e.g., a phone number or an email address); other suitable item information; or any suitable combination of such information. In particular embodiments, item node 204 may be associated with one or more data objects corresponding to information associated with item node 204.

As described above, recommendation graph 200 associated with the particular user may include one or more item nodes 204 connected to recommending user nodes 202 by an edge 206. In particular embodiments, the social-networking system may create an edge (e.g. a "recommend" or "not recommend" edge) between a recommending user node 202 corresponding to the recommending user and item node 204 corresponding to, for example, a particular geo-location or resource and store edge 206 in one or more data stores in response to receiving a recommendation from a recommending user, as described below. As an example and not by way of limitation, the social-networking system may create a "recommend" or "not recommend" edge 206 in response to receiving a recommendation from a recommending user through a recommendation page.

In particular embodiments, edge 206 may include or represent one or more data objects or attributes associated with the recommendation of a item node 204 by a recommending user node 202. As an example and not by way of limitation, a first user may "recommend" a particular restaurant to a second user. As another example, the first user may "not recommend" a particular television show to the second user. In the example of FIG. 2, a recommending user (user "B") may recommend a particular business ("Milk Pail"). As another example, a recommending user (user "A") may not recommend a particular book ("Atlas Shrugged"). As an example and not by way of limitation, the social-networking system may create a "recommend" edge 206 (as illustrated in FIG. 2) between item nodes 204 corresponding to the song and the recommending user. As described above, as illustrated in FIG. 2, edge 206 between recommending user node 202 and item node 204 may represent a positive recommendation (i.e. "recommend") or negative recommendation (i.e. "not recommend"). Although this disclosure describes particular attributes associated with particular edges, this disclosure contemplates any suitable attributes associated with any suitable edges connecting recommending user nodes and item nodes.

In particular embodiments, a recommending user providing a recommendation may augment the recommendation with an explanation. In particular embodiments, the explanation associated with the recommendation may be stored as one or more data objects or attributes of edge 206. As an example and not by way of limitation, the recommending user may provide an explanation associated with the recommendation, such as for example, a particular restaurant specializes in a cuisine of interest to the particular user. In the example of FIG. 2, "recommend" edge 206 may correspond to the recommendation of an item (e.g. "Milk Pail") by the recommending user (e.g. user "B"). As an example and not by way of limitation, the recommending user may provide an explanation to provide information augmenting the recommendation for the particular user, such as for example, the Milk Pail has a good selection of cheese.

As described above, the recommending user may provide a recommendation through the social-networking system. In particular embodiments, a recommendation may take the form of recommending (or not recommending) followed by the particular item associated with the recommendation, an explanation for the recommendation, and the particular user the recommendation is directed toward. As an example and not by way of limitation, an example syntax of a recommendation may be "recommend item for explanation to particular user", where the item, explanation, and particular user indicates information provided by the recommending users. As described above, As an example and not by way of limitation, user "B" may provide a recommendation such as for example, recommend Milk Pail for great cheese selection to user "X". The recommendation graph of user "X" may incorporate the example recommendation by generating a item node 204A for "Milk Pail" and a recommending user node 202A for user "B" with an edge 206A connecting item node 204A with recommending user node 202A. Although this disclosure describes particular edges 206 with particular attributes connecting user nodes 202 and concept nodes 204, this disclosure contemplates any suitable edges 206 with any suitable attributes connecting user nodes 202 and concept nodes 204. Although this disclosure describes forming particular edges 206 in particular manners, this disclosure contemplates forming any suitable edges 206 in any suitable manner. Herein, references to users or concepts being connected may, where appropriate, refer to the nodes corresponding to those users or concepts being connected in recommendation graph 200 by one or more edges 206.

Figure 3:
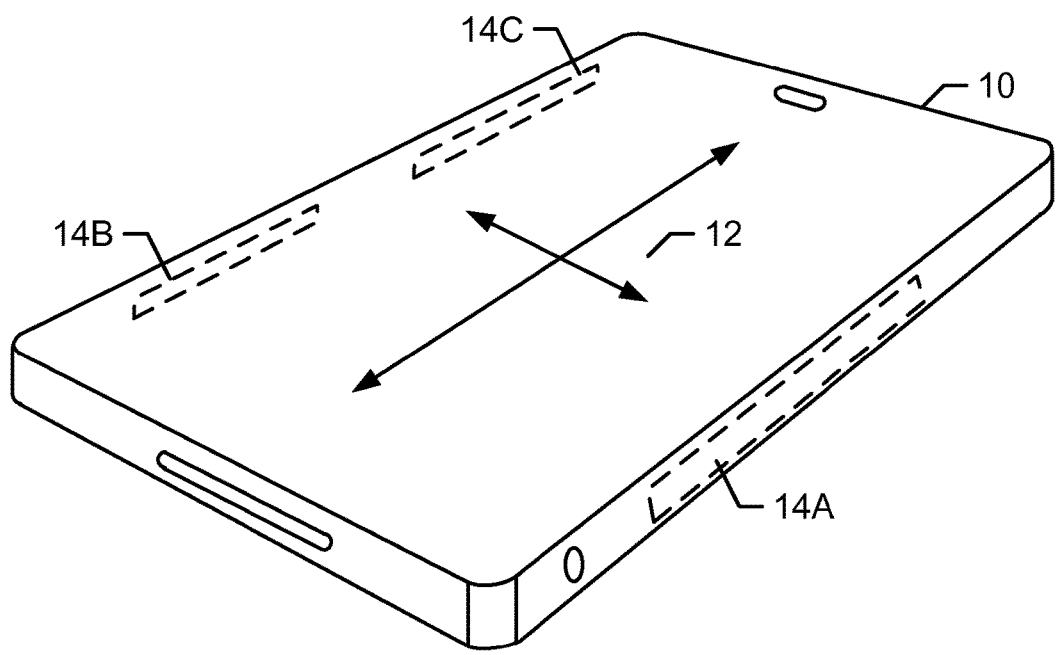
FIG. 3 illustrates an example mobile device.

FIG. 3 illustrates an example mobile device. In particular embodiments, the client system may be a mobile device 10 as described above. This disclosure contemplates mobile device 10 taking any suitable physical form. In particular embodiments, mobile device 10 may be a computing system as described below. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch sensor 12 as an input component. In the example of FIG. 3, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

In particular embodiments, the social-networking system or the third-party system may poll or "ping" mobile device 10 using a activation signal to obtain location information. As an example and not by way of limitation, the social-networking system may poll the application of mobile device 10 for location data by sending the activation signal activate the location service of mobile device 10. The activation signal may be transmitted using a wireless communication protocol such as for example, WI-FI or third-generation mobile telecommunications (3G) and received by mobile device 10 through one or more antennae 14A-B. In particular embodiments, the location service of mobile device 10 may use one or more methods of location determination, such as for example, using the location of one or more cellular towers, crowd-sourced location information associated with a WI-FI hotspot, or the global-positioning system (GPS) function of mobile device 10. As described above, the social-networking system may, automatically and without manual input, determine a geo-location associated with mobile device 10 based in part on the location data provided by mobile device 10.

In particular embodiments, the social-networking system may correlate the location of mobile device 10 with the recommendation-graph information associated with the user. As an example and not by way of limitation, the social-networking system may access one or more recommendations associated with the current geo-location of mobile device 10. In particular embodiments, the social-networking system may send a notification to mobile device 10 associated with a user based at least in part on the current geo-location as determined by the location data of mobile device 10. As an example and not by way of limitation, the notification may be a modal window displaying one or more recommendations on the display of mobile device 10. Moreover, the content displayed in the modal window may include an explanation for the recommendation. As an example and not by way of limitation, the social-networking system may send a notification to mobile device 10 in response to determining mobile device 10 is currently near or at the "Milk Pail". The notification may say "User B recommends the Milk Pail for good cheese selection." In particular embodiments, the geo-location may include a pre-determined area encompassing the geo-location, a building associated with the geo-location, or a site associated with the geo-location. As an example and not by way of limitation, a geo-location may be a movie theater, restaurant, landmark, or city. Although this disclosure describes particular geo-locations, this disclosure contemplates any suitable geo-location.

As described above, the recommendation graph associated with the user stored on the social-networking system may be accessed through mobile device 10. As an example and not by way of limitation, the user may access the recommendation graph associated with the user and view one or more recommendations stored in the recommendation graph through mobile device 10. As an example and not by way of limitation, a user interested in restaurants may access one or more recommendations for restaurants stored in the recommendation graph associated with the user through mobile device 10. The recommendations may be ranked by proximity to the current geo-location of mobile device 10 or the relationship between the user recommending user based at least in part on social-graph information.

Figure 4:
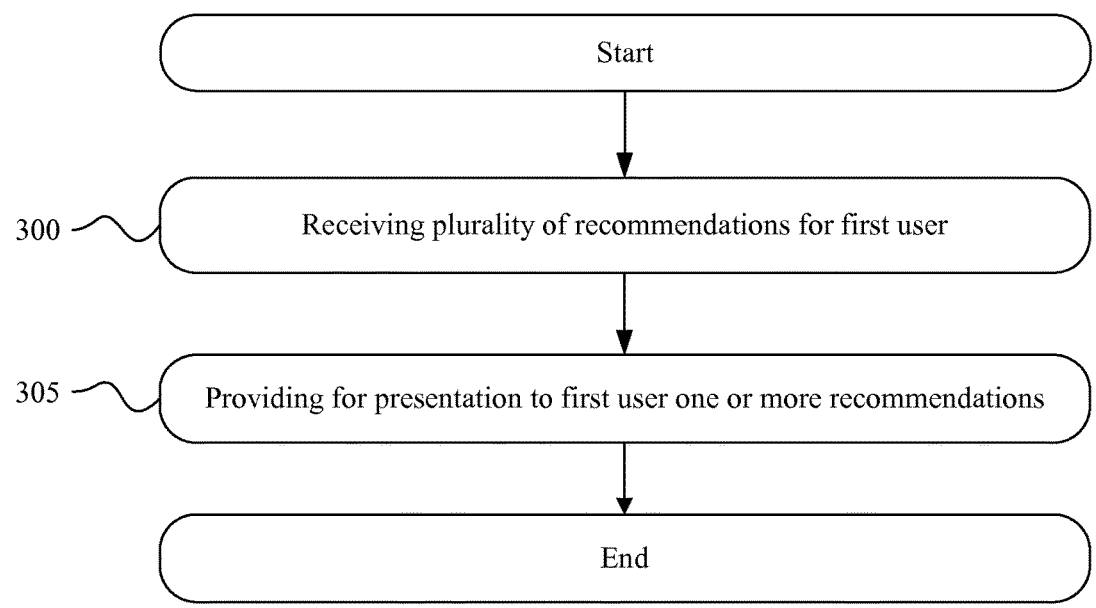
FIG. 4 illustrates an example method for sending a recommendation for a particular user.

FIG. 4 illustrates an example method for sending a recommendation for a particular user. The method may start at step 300, where a server computing device receives a plurality of recommendations for a first user. In particular embodiments, each recommendation is made by one of a plurality of second users. As an example and not by way of limitation, each recommendation may include information that: identifies an item being recommended; provides an explanation for the recommendation; identifies the first user as an addressee of the recommendation; and identifies the second user as an author of the recommendation. At step 305, the server computing device provides for presentation to the first user one or more of the recommendations, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
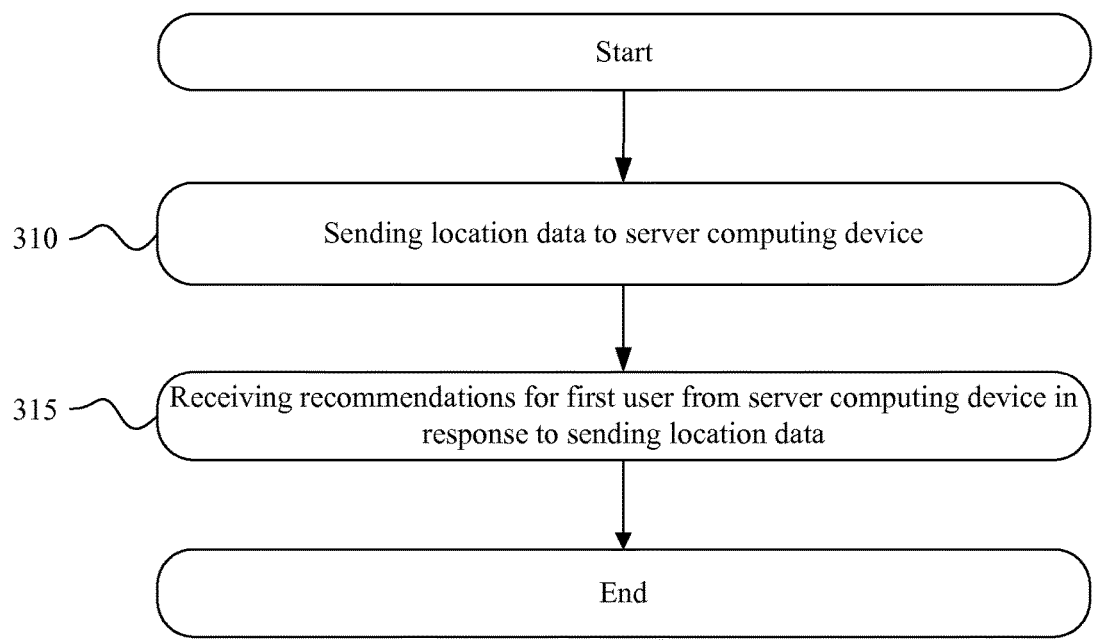
FIG. 5 illustrates an example method for receiving a recommendation for a particular user.

FIG. 5 illustrates an example method for receiving a recommendation for a particular user. The method may start at step 310, where a mobile client computing device sends location data to a server computing device. In particular embodiments, the location data may correspond to a current geo-location of the mobile client computing device associated with a first user. At step 315, receiving one or more recommendations for the first user from the server computing device in response to sending the location data, at which point the method may end. In particular embodiments, each recommendation is made by one of a plurality of second users. In particular embodiments, each recommendation includes information that: identifies an item being recommended; provides an explanation for the recommendation; identifies the first user as an addressee of the recommendation; and identifies the second user as an author of the recommendation. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
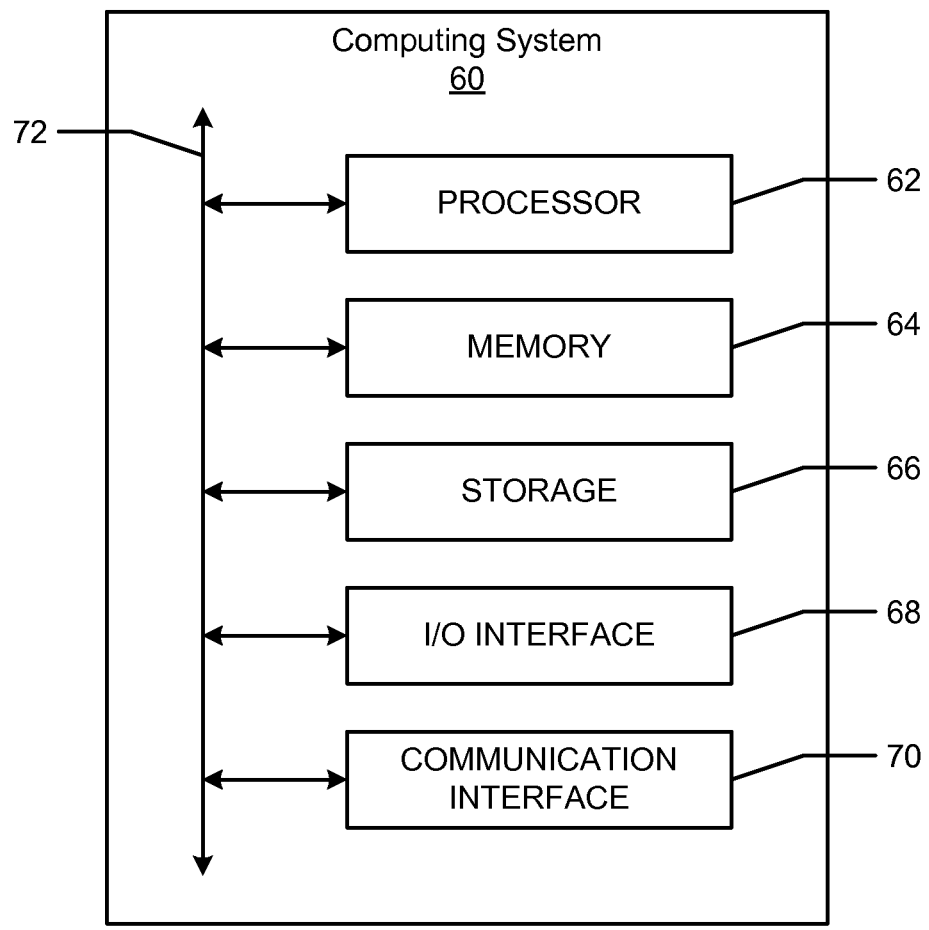
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Figure 7:
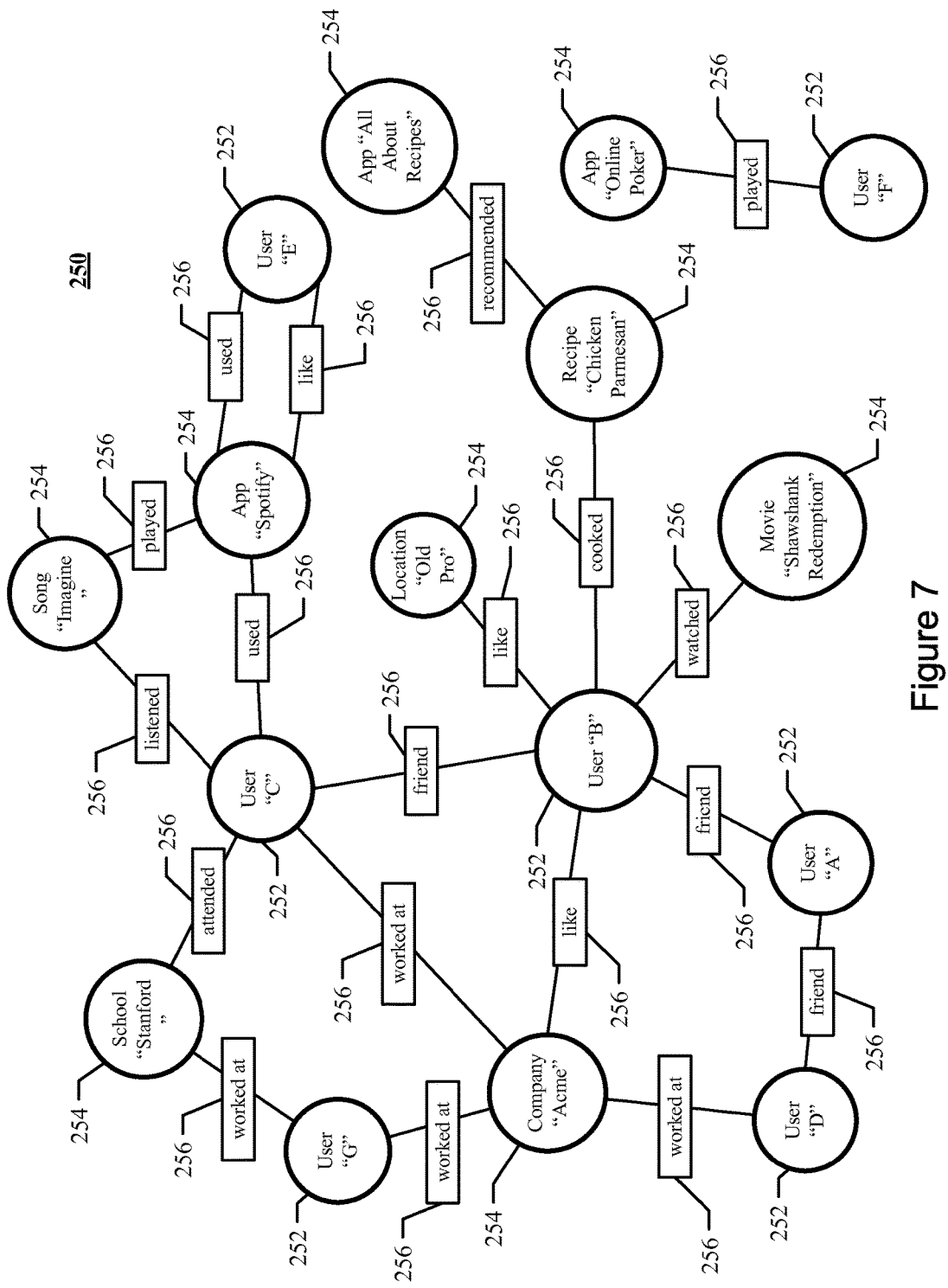
FIG. 7 illustrates an example social graph.

FIG. 7 illustrates example social graph 250. In particular embodiments, social-networking system 160 may store one or more social graphs 250 in one or more data stores. Although this disclosure describes and illustrates a recommendation graph that is separate from a social graph, this disclosure contemplates a recommendation graph having any suitable relationship with the social graph, such as for example, having nodes or edges common to the recommendation graph and social graph, or the recommendation graph being a subset of the social graph. In particular embodiments, social graph 250 may include multiple nodes—which may include multiple user nodes 252 or multiple concept nodes 254—and multiple edges 256 connecting the nodes. Example social graph 250 illustrated in FIG. 7 is shown, for didactic purposes, in a two-dimensional visual map representation. In particular embodiments, a social-networking system 160, client system 130, or third-party system 170 may access social graph 250 and related social-graph information for suitable applications. The nodes and edges of social graph 250 may be stored as data objects, for example, in a data store (such as a social-graph database). Such a data store may include one or more searchable or queryable indexes of nodes or edges of social graph 250.

In particular embodiments, a user node 252 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 252 corresponding to the user, and store the user node 252 in one or more data stores. Users and user nodes 252 described herein may, where appropriate, refer to registered users and user nodes 252 associated with registered users. In addition or as an alternative, users and user nodes 252 described herein may, where appropriate, refer to users that have not registered with social-networking system 160. In particular embodiments, a user node 252 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 252 may be associated with one or more data objects corresponding to information associated with a user. In particular embodiments, a user node 252 may correspond to one or more webpages.

In particular embodiments, a concept node 254 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 254 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 254 may be associated with one or more data objects corresponding to information associated with concept node 254. In particular embodiments, a concept node 254 may correspond to one or more webpages.

In particular embodiments, a node in social graph 250 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 254. Profile pages may be viewable by all or a selected subset of other users. As an example and not by way of limitation, a user node 252 may have a corresponding user-profile page in which the corresponding user may add content, make declarations, or otherwise express himself or herself. As another example and not by way of limitation, a concept node 254 may have a corresponding concept-profile page in which one or more users may add content, make declarations, or express themselves, particularly in relation to the concept corresponding to concept node 254.

In particular embodiments, a concept node 254 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 252 corresponding to the user and a concept node 254 corresponding to the third-party webpage or resource and store edge 256 in one or more data stores.

In particular embodiments, a pair of nodes in social graph 250 may be connected to each other by one or more edges 256. An edge 256 connecting a pair of nodes may represent a relationship between the pair of nodes. In particular embodiments, an edge 256 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 256 connecting the first user's user node 252 to the second user's user node 252 in social graph 250 and store edge 256 as social-graph information in one or more of data stores 24. In the example of FIG. 7, social graph 250 includes an edge 256 indicating a friend relation between user nodes 252 of user "A" and user "B" and an edge indicating a friend relation between user nodes 252 of user "C" and user "B." Although this disclosure describes or illustrates particular edges 256 with particular attributes connecting particular user nodes 252, this disclosure contemplates any suitable edges 256 with any suitable attributes connecting user nodes 252. As an example and not by way of limitation, an edge 256 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 250 by one or more edges 256.

In particular embodiments, an edge 256 between a user node 252 and a concept node 254 may represent a particular action or activity performed by a user associated with user node 252 toward a concept associated with a concept node 254. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 254 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 256 and a "used" edge (as illustrated in FIG. 7) between user nodes 252 corresponding to the user and concept nodes 254 corresponding to the song and application to indicate that the user listened to the song and used the application. Moreover, social-networking system 160 may create a "played" edge 256 (as illustrated in FIG. 7) between concept nodes 254 corresponding to the song and the application to indicate that the particular song was played by the particular application. In this case, "played" edge 256 corresponds to an action performed by an external application (SPOTIFY) on an external audio file (the song "Imagine"). Although this disclosure describes particular edges 256 with particular attributes connecting user nodes 252 and concept nodes 254, this disclosure contemplates any suitable edges 256 with any suitable attributes connecting user nodes 252 and concept nodes 254. Moreover, although this disclosure describes edges between a user node 252 and a concept node 254 representing a single relationship, this disclosure contemplates edges between a user node 252 and a concept node 254 representing one or more relationships. As an example and not by way of limitation, an edge 256 may represent both that a user likes and has used at a particular concept. Alternatively, another edge 256 may represent each type of relationship (or multiples of a single relationship) between a user node 252 and a concept node 254 (as illustrated in FIG. 7 between user node 252 for user "E" and concept node 254 for "SPOTIFY").

In particular embodiments, social-networking system 160 may create an edge 256 between a user node 252 and a concept node 254 in social graph 250. As an example and not by way of limitation, a user viewing a concept-profile page (such as, for example, by using a web browser or a special-purpose application hosted by the user's client system 130) may indicate that he or she likes the concept represented by the concept node 254 by clicking or selecting a "Like" icon, which may cause the user's client system 130 to send to social-networking system 160 a message indicating the user's liking of the concept associated with the concept-profile page. In response to the message, social-networking system 160 may create an edge 256 between user node 252 associated with the user and concept node 254, as illustrated by "like" edge 256 between the user and concept node 254. In particular embodiments, social-networking system 160 may store an edge 256 in one or more data stores. In particular embodiments, an edge 256 may be automatically formed by social-networking system 160 in response to a particular user action. As an example and not by way of limitation, if a first user uploads a picture, watches a movie, or listens to a song, an edge 256 may be formed between user node 252 corresponding to the first user and concept nodes 254 corresponding to those concepts. Although this disclosure describes forming particular edges 256 in particular manners, this disclosure contemplates forming any suitable edges 256 in any suitable manner.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a server computing device, receiving one or more recommendations from one or more second users for the first user, wherein the one or more recommendations are associated with one or more items corresponding to one or more nodes of a social graph at one or more geo-locations and wherein the one or more second users select the first user as an addressee of the one or more recommendations, each of the one or more recommendations comprising information that:
identifies the respective item being recommended;
identifies the geo-location associated with the item being recommended;
provides an explanation for the recommendation;
identifies the first user as the addressee of the recommendation; and
identifies the respective second user as an author of the recommendation;
by the server computing device, storing the one or more recommendations;
by the server computing device, determining, in response to receiving location data from a mobile client computing device associated with the first user, whether the mobile client computing device is near one or more of the geo-locations associated with respective one or more of the items being recommended;
by the server computing device, ranking the one or more recommendations based on relative location proximities of the one or more items being recommended to the mobile client computing device and further based on a relationship between the first user and each respective second user within the social graph; and
by the server computing device, providing automatically to the mobile client computing device the stored one or more recommendations for presentation to the first user in response to the determination that the mobile client computing device is near one or more geo-locations associated with respective one or more items being recommended, wherein the stored recommendations are presented in an order based on their respective rankings, each of the stored recommendations comprising:
a description of the respective item associated with the respective geo-location;
the explanation for the recommendation; and
an identification of the respective second user as the author of the recommendation.

2. The method of claim 1, further comprising:
receiving a plurality of recommendations for the first user;
aggregating the recommendations; and
generating a recommendation graph for the first user based on the recommendations.

3. The method of claim 2, wherein the recommendation graph comprises:
a plurality of nodes and edges connecting the nodes;
at least one node in the graph corresponds to the item;
at least one node in the graph corresponds to the second user; and
a relationship between the item and the second user comprises at least one of the nodes corresponding to the item being connected to at least one of the nodes corresponding to the second user by one or more edges.

4. The method of claim 2, further comprising accessing the recommendation graph in response to receiving the location data from the mobile client computing device.

5. The method of claim 2, further comprising accessing the recommendation graph in response to receiving a query from the first user.

6. The method of claim 1, wherein the item is a place and the recommendation is provided to the first user automatically and without manual input in response to the location data of the mobile client computing device associated with the first user corresponding to the place.

7. The method of claim 1, wherein the providing comprises sending an e-mail, modal window, balloon, short-messaging service (SMS) message, or multimedia-messaging service (MMS) message to the mobile client computing device.

8. One or more computer-readable non-transitory storage media embodying logic configured when executed to:
receive one or more from one or more second users for the first user, wherein the one or more recommendations are associated with one or more items corresponding to one or more nodes of a social graph at one or more geo-locations and wherein the one or more second users select the first user as an addressee of the one or more recommendations, each of the one or more recommendations comprising information that:
identifies the respective item being recommended;
identifies the geo-location associated with the item being recommended;
provides an explanation for the recommendation;
identifies the first user as the addressee of the recommendation; and
identifies the respective second user as an author of the recommendation;
store the one or more recommendations;
determine, in response to receiving location data from a mobile client computing device associated with the first user, whether the mobile client computing device is near one or more of the geo-locations associated with respective one or more of the items being recommended;
ranking the one or more recommendations based on relative location proximities of the one or more items being recommended to the mobile client computing device and further based on a relationship between the first user and each respective second user, wherein the relationship is based on information from the social graph; and
provide automatically to a mobile client computing device the stored one or more recommendations for presentation to the first user in response to the determination that the mobile client computing device is near one or more geo-locations associated with respective one or more items being recommended, wherein the stored recommendations are presented in an order based on their respective rankings, each of the stored recommendations comprising:
a description of the respective item associated with the respective geo-location;
the explanation for the recommendation; and
an identification of the respective second user as the author of the recommendation.

9. The media of claim 8, wherein the logic is further configured to:
receive a plurality of recommendations for the first user;
aggregate the recommendations; and generate a recommendation graph for the first user based on the recommendations.

10. The media of claim 9, wherein the recommendation graph comprises:
    a plurality of nodes and edges connecting the nodes;
    at least one node in the graph corresponds to the item;
    at least one node in the graph corresponds to the second user; and
    a relationship between the item and the second user comprises at least one of the nodes corresponding to the item being connected to at least one of the nodes corresponding to the second user by one or more edges.

11. The media of claim 9, wherein the logic is further configured to access the recommendation graph in response to receiving the location data from the mobile client computing device.

12. The media of claim 9, wherein the logic is further configured to access the recommendation graph in response to receiving a query from the first user.

13. The media of claim 8, wherein the item is a place and the recommendation is provided to the first user automatically and without manual input in response to the location data of the mobile client computing device corresponding to the place.

14. The media of claim 8, wherein the logic is further configured to send e-mail, modal window, balloon, short-messaging service (SMS) message, or multimedia-messaging service (MMS) message to the mobile client computing device.

15. A system comprising: one or more processors; and a non-transitory memory coupled to the processors comprising instructions executable by the processors, the processors operable when executing the instructions to:
    receive one or more from one or more second users for the first user, wherein the one or more recommendations are associated with one or more items corresponding to one or more nodes of a social graph at one or more geo-locations and wherein the one or more second users select the first user as an addressee of the one or more recommendations, each of the one or more recommendations comprising information that:
        identifies the respective item being recommended;
        identifies the geo-location associated with the item being recommended;
        provides an explanation for the recommendation;
        identifies the first user as the addressee of the recommendation; and
        identifies the respective second user as an author of the recommendation;
    store the one or more recommendations;
    determine, in response to receiving location data from a mobile client computing device associated with the first user, whether the mobile client computing device is near one or more of the geo-locations associated with respective one or more of the items being recommended;
    ranking the one or more recommendations based on relative location proximities of the one or more items being recommended to the mobile client computing device and further based on a relationship between the first user and each respective second user, wherein the relationship is based on information from the social graph; and
    provide automatically to a mobile client computing device the stored one or more recommendations for presentation to the first user in response to the determination that the mobile client computing device is near one or more geo-locations associated with respective one or more items being recommended, wherein the stored recommendations are presented in an order based on their respective rankings, each of the stored recommendations comprising:
        a description of the respective item associated with the respective geo-location;
        the explanation for the recommendation; and
        an identification of the respective second user as the author of the recommendation.

16. The system of claim 15, the processors further operable to:
    receive a plurality of recommendations for the first user;
    aggregate the recommendations; and
    generate a recommendation graph for the first user based on the recommendations.

17. The system of claim 16, wherein the recommendation graph comprises:
    a plurality of nodes and edges connecting the nodes;
    at least one node in the graph corresponds to the item;
    at least one node in the graph corresponds to the second user; and
    a relationship between the item and the second user comprises at least one of the nodes corresponding to the item being connected to at least one of the nodes corresponding to the second user by one or more edges.

18. The system of claim 16, the processors further operable to access the recommendation graph in response to receiving the location data from the mobile client computing device.

19. The system of claim 16, the processors further operable to access the recommendation graph in response to receiving a query from the first user.

20. The system of claim 15, wherein the item is a place and the recommendation is provided to the first user automatically and without manual input in response to the location data of the mobile client computing device corresponding to the place.

21. The system of claim 15, the processors further operable to send e-mail, modal window, balloon, short-messaging service (SMS) message, or multimedia-messaging service (MMS) message to the mobile client computing device.

* * * * *